United States Patent [19]

Levijoki

[11] 4,105,088
[45] Aug. 8, 1978

[54] SERVOMOTOR WITH POSITION FEEDBACK

[75] Inventor: Wayne A. Levijoki, Clio, Mich.

[73] Assignee: General Motors Corporation, Detroit, Mich.

[21] Appl. No.: 774,925

[22] Filed: Mar. 7, 1977

[51] Int. Cl.² .............................................. B60K 31/00
[52] U.S. Cl. ................................. 180/108; 123/103 R; 180/105 E
[58] Field of Search ................. 180/108, 105 E, 110; 123/103 R, 103 D, 103 E

[56] References Cited

U.S. PATENT DOCUMENTS

| | | | |
|---|---|---|---|
| 3,157,244 | 11/1964 | McMurray et al. | 180/108 |
| 3,195,672 | 7/1965 | Brennan | 123/103 R |
| 3,319,733 | 5/1967 | Rath et al. | 180/106 |
| 3,405,779 | 10/1968 | Johnson | 180/108 |
| 3,419,105 | 12/1968 | Hagler et al. | 180/108 |
| 3,556,245 | 1/1971 | Radin | 180/108 |
| 3,644,813 | 2/1972 | Schoendorff | 318/318 |
| 3,752,249 | 8/1973 | Gelenius | 180/105 E |
| 3,869,019 | 3/1975 | Cardani | 180/105 E |
| 3,921,751 | 11/1975 | Sakakibara | 180/108 |

*Primary Examiner*—Robert R. Song
*Assistant Examiner*—Donn McGiehan
*Attorney, Agent, or Firm*—D. D. Mc Graw

[57] ABSTRACT

A vehicle road speed control system has a differential pressure actuated servomotor as a part of a power unit including an integral solenoid controlled valve assembly. The servomotor and valve assembly includes a servomotor output position feedback path. The solenoid valve asembly is of the repulsion armature type with the load spring coupled to the servomotor power wall to introduce position feedback. Two modifications of the valve orifice control arrangement are disclosed.

4 Claims, 3 Drawing Figures

SERVOMOTOR WITH POSITION FEEDBACK

The invention relates to a servomotor and a vehicle road speed control system, and more particularly to a differential pressure operated servomotor having a position feedback arrangement. The servomotor has a power wall of the diaphragm type cooperating with a housing fixed wall to define a variable pressure controlled chamber on one side of the power wall, with the other side of the power wall being exposed to atmospheric pressure. The valve assembly is mounted in a recess in the fixed wall provided for this purpose. The valve assembly has an atmospheric pressure inlet port, a subatmospheric pressure port adapted to be connected to a source of subatmospheric pressure such as the intake manifold of the vehicle engine, a fixed valve member and a movable valve member providing port or orifice means controlled by relative movement of the two valve members, the orifice means normally connecting the variable pressure chamber with the atmospheric pressure inlet port and being movable to modulate that connection to establish a pressure in the variable pressure control chamber intermediate atmospheric pressure and the supplied subatmospheric pressure to control movement of the servomotor power wall. The power wall is adapted to be connected to the throttle valve control mechanism of the vehicle to provide for vehicle road speed control in accordance with signals controlling valve member movements. A position feedback spring acts between the power wall and the movable valve member to increase the spring force in inverse relationship to the distance between the power wall and the valve member. The valve assembly includes means mounted on the housing fixed wall and selectively urging the valve member against the force of the position feedback spring in accordance with power wall position demand and position error. In a road speed control system, desired vehicle speed is related to power wall position demand, and the difference between actual and desired vehicle speed is related to position error. In the preferred embodiment this means is a repulsion armature type of solenoid and magnet arrangement, the magnet being mounted on and movable with the movable valve member. The solenoid is adapted to be energized through a logic control which generates control signals in accordance with actual vehicle speed and desired vehicle speed and engagement selection. When the road speed control system is actuated the control signals act through the solenoid and on the magnet to move the movable valve member against the spring force of the position feedback spring to control the movement and position of the power wall to move the vehicle throttle valve mechanism and thereby control the vehicle engine so that the vehicle substantially maintains the desired speed. The magnet urges the valve member against the force of the position feedback spring with a force which decreases inversely with the distance that the valve member moves away from the housing fixed wall, and therefore away from the solenoid coil, toward the servomotor power wall.

This arrangement provides several desirable characteristics in a road speed control system, including position integrity, decreased demand response with a reduction in steadystate vacuum usage, and reduction in servomotor gain. A system using this type of servomotor can also increase altitude performance by providing a constant force hold mode with minimum vacuum usage.

IN THE DRAWINGS

Figure 1:
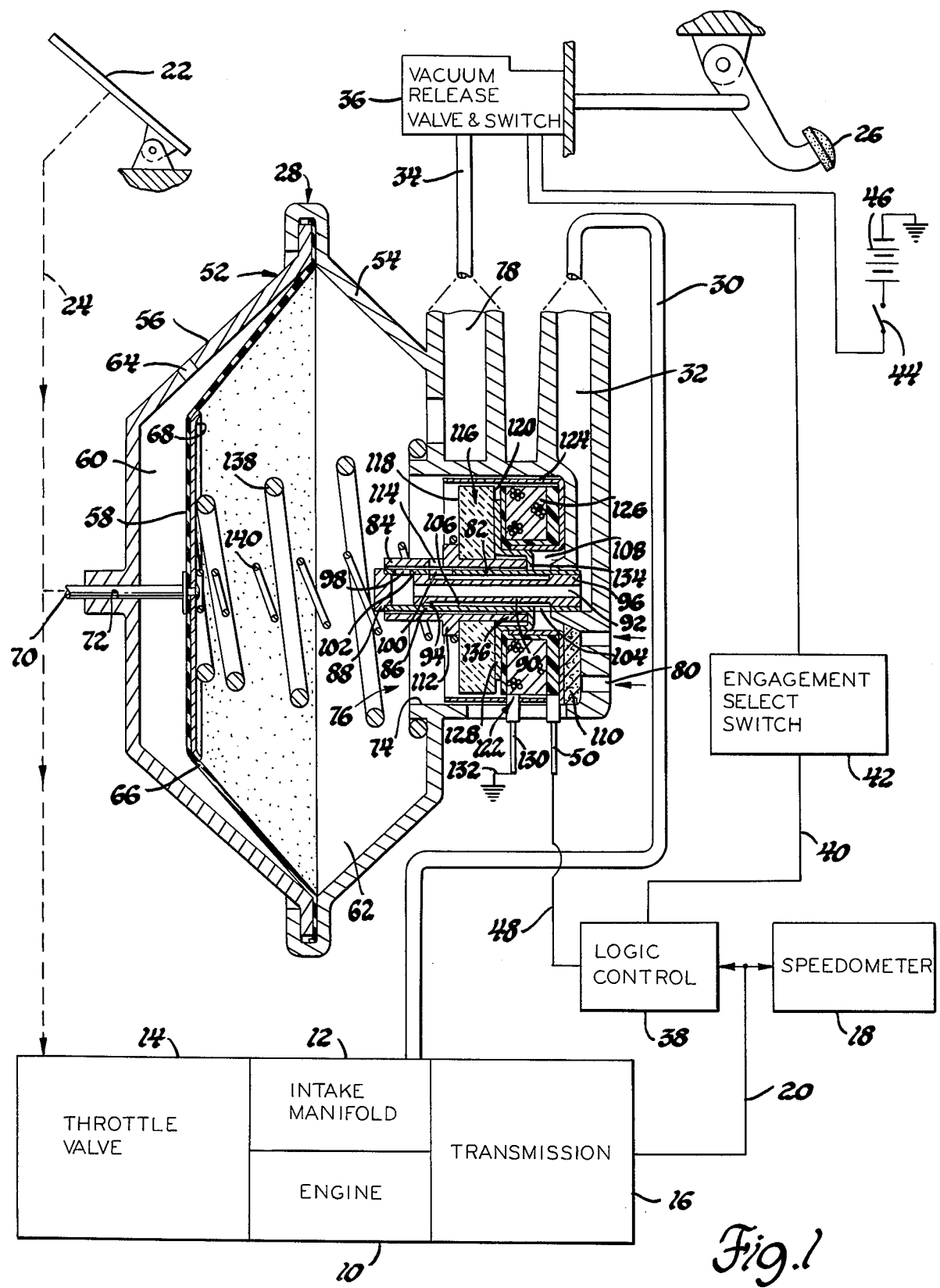
FIG. 1 is a schematic illustration of a vehicle road speed control system having a servomotor embodying the invention, portions being shown broken away and in section.

The road speed control system schematically illustrated in FIG. 1 is shown as including various portions of a vehicle. The vehicle portions include an engine 10 having an intake manifold 12 and a throttle valve 14. The engine drives a transmission 16 which in turn provides power to the driving wheels of the vehicle, all in the well known manner. A speedometer 18 is driven through a mechanical or electrical drive line 20 from a suitable portion of the vehicle drive line such as the output end of transmission 16. The vehicle includes an accelerator pedal 22 connected to suitable throttle linkage 24 to control the throttle valve 14 in the usual manner to control vehicle speed. The vehicle also includes a brake pedal 26 which when actuated causes the vehicle brakes to be energized to decelerate the vehicle under the control of the vehicle operator.

The road speed control system includes the servomotor 28 and a conduit 30 connecting the servomotor subatmospheric pressure port 32 with the engine intake manifold 12. The intake manifold, being a source of vacuum, is the source of subatmospheric pressure for the servomotor. The servomotor is connected by another conduit 34 to a vacuum release valve and switch 36 which opens the conduit 34 to atmospheric pressure when the brake pedal 26 is actuated. The switch portion is normally closed, but opens upon brake pedal actuation. The road speed control system also includes a logic control 38 of a suitable type. By way of example, the logic control may be similar to that shown in U.S. Pat. Nos. 3,644,813, issued Feb. 22, 1972, or 3,869,019, issued Mar. 4, 1975. The logic control 38 is connected with the drive line 20 to receive a signal indicating actual vehicle speed. It is electrically connected by lead 40 to the engagement select switch 42. This switch is in electrical series with the switch portion of brake release valve and switch 36 and the ignition switch 44. It is therefore connected through those switches to the vehicle battery 46. The logic control 38 has an output lead 48 electrically connected to the servomotor terminal 50. Lead 48 transmits the output signals of the logic control to control the servomotor valve assembly, as will be described. The actuation of the engagement select switch 42 provides for the establishment of a desired speed signal in the logic control 38 through lead 40. The logic control compares the actual speed signal from drive line 20 with the desired speed signal, and generates the control signals transmitted through lead 48 which will control the servomotor so that the servomotor acts through the throttle linkage to attain the desired vehicle speed and maintain the vehicle at the desired speed.

The servomotor 28 includes a housing 52 having a fixed wall 54. The housing is illustrated as having another fixed wall 56. A servomotor power wall 58 is positioned between the fixed walls 54 and 56 and cooperates with those walls to define an atmospheric pressure chamber 60 between fixed wall 56 and power wall 58, and a variable pressure chamber 62 between fixed wall 54 and power wall 58. A vent 64 in fixed wall 56 is provided to continually communicate chamber 60 with atmosphere. A construction similar to that of FIG. 3 may also be used in which fixed wall 56 is eliminated and the power wall is exposed directly to atmosphere. The power wall 58 is illustrated as being a flexible diaphragm 66 having a diaphragm support plate 68 in the center portion of the diaphragm. A power wall output member 70 is illustrated as being a rod with one end connected to the center power wall 58, the rod extending through a guide opening 72 in fixed wall 56 and arranged to be suitably connected to the throttle linkage 24. It is desirable to utilize a usual method of connection to the throttle linkage such as a bead chain which will transmit only tension forces to the throttle linkage tending to open the throttle valve 14 against the force of the usual throttle valve closing spring.

Fixed wall 54 has a recessed center portion defining a recess 74 receiving the valve assembly 76. The wall is also illustrated as incorporating the vacuum release port 78, which is in direct communication with variable pressure chamber 62 and conduit 34. It is to be noted that vacuum release valve and switch assembly 36 is a normally closed valve and switch assembly so that the fluid pressure in chamber 62 is also found in release port 78 and conduit 34. Fixed wall 54 is also formed to define the subatmospheric pressure port 32 earlier described, and has atmospheric air inlets 80.

The valve assembly 76 includes an orifice tube 82 which also functions as a guide and support member for the movable valve member 84, and is itself a valve member. Tube 82 includes an outer cylinder 86 extending from the inner end of port 32 and through recess 74 into chamber 62. The end of cylinder 86 terminating in chamber 62 is sealed by plug 88. A spool 90, having a central passage 92 extending therethrough and end lands 94 and 96, is fitted within cylinder 86. Cylinder 86 has a pair of axially spaced ports 98 and 100 separated by a cylinder wall section 102, port 98 being adjacent to plug 88. Spool 90 is of lesser axial length than cylinder 86 and is positioned so that its land 94 is located axially intermediate ports 98 and 100 and in engagement with cylinder wall section 102 separating those ports. This provides an arrangement wherein the subatmospheric pressure port 32 is in fluid communication at all times with port 98 through passage 92 and the end of cylinder 86 between plug 88 and land 94 of spool 90. Cylinder 86 has another port 104 adjacent land 96 of spool 90 and so arranged that it is axially intermediate spool lands 94 and 96. It can be seen that the center portion of spool 90 between the spool lands cooperates with the inner wall of cylinder 86 to define an annular passage 106 and provides continuous fluid communication between ports 100 and 104. Port 104 is open to the atmospheric pressure inlets 80 through the solenoid chamber 108 and the air filter 110.

Valve member 84 is cylindrical, is slidably fitted over the outer wall of cylinder 86 of member 82, has a flange 112 extending radially outwardly from a center portion, and has a control port 114 provided radially through one wall surface. A permanent magnet 116, of annular configuration with opposite poles on the magnet side faces 118 and 120, is secured to valve member 84 against the opposite side of flange 112 from control port 114. The solenoid includes a bobbin and terminal assembly 122 contained within recess 74. The bobbin case 124 contains the solenoid coil 126 and the field plate 128. Plate 128 is positioned axially intermediate the solenoid coil 126 and the magnet 116. Terminal 50 is connected to solenoid coil 126 as is terminal 130, in the usual manner. As schematically illustrated, terminal 50 is connected to lead 48 and terminal 130 is connected to a lead 132 leading to electrical ground. Field plate 128 has an inwardly turned flange 134 which is in axial engageable relation with the end 136 of valve member 84 and acts as a position stop for the valve member when the system is not energized. In this position of the valve member, shown in FIG. 1, control port 114 is fully open in relation to port 100, and port 98 is closed by a portion of valve member 84. Therefore variable pressure chamber 62 under this condition is at atmospheric air pressure, being so connected from inlets 80 through chamber 108, port 104, passage 106, and ports 100 and 114.

A power wall return spring 138 is a compression spring with one end seated on diaphragm support plate 68 of power wall 58 and the other end seated on fixed wall 54 of the servomotor housing 52. A position feedback spring 140 is a much lighter compression spring with one end seated on diaphragm support plate 68 and the other end seated on the structure defined by valve member 84 and magnet 116. Thus spring 140 continually urges the valve member 84 to the inactive position shown in FIG. 1.

The system is illustrated in the inactive position. Atmospheric air pressure exists in chambers 60 and 62. Vacuum release valve and switch 36 are closed. Solenoid coil 126 is not energized. With the vehicle in operation, ignition switch 44 is closed. When the vehicle operator has brought the vehicle to a desired speed for cruise by manual operation of the accelerator pedal 22, he actuates the engagement select switch 42. This energizes the logic control 38, establishing the vehicle speed at the moment of energization, as sensed through drive line 20, as the desired speed. The logic control generates appropriate signals and sends them through lead 48 to energize solenoid coil 126. Energization of this coil generates a magnetic force which acts on magnet 116 to repulse the magnet. The force so generated tends to move magnet 116 and valve member 84 leftwardly against the force of position feedback spring 140. As this movement occurs, port 114 begins to restrict the connection to port 100 and upon sufficient valve member movement closes port 100. At this point, which is a poise position, port 114 is closed by cylinder wall section 102. Further movement of valve member 84 toward power wall 58 causes port 114 to begin to open port 98. This opens fluid communication between variable pressure chamber 62 and the source of subatmospheric pressure 12 through port 98, passage 92, port 32, and conduit 30. The absolute pressure in chamber 62 therefore decreases. The rate of decrease is controlled by the amount of opening determined by the registration of port 114 with port 98. The decrease in pressure in chamber 62, with atmospheric pressure on the other side of power wall 58 in chamber 60, generates a force on the power wall urging the power wall rightwardly as seen in FIG. 1. Much of this force is resisted by spring 138, and a small amount of the force is also resisted by position feedback spring 140. The springs are insufficient to prevent such movement of power wall 58, however, once a predetermined pressure differential across the power wall has been created. As the power wall moves rightwardly, the load on position feedback spring 140 increases, tending to urge valve member 84 and magnet 116 rightwardly against the repulsion force generated by solenoid coil 126. Valve member 84 will be moved until port 114 again reaches the poise position in which port 98 is closed. This will cut off any further decrease in absolute pressure in chamber 62, so that the power wall reaches a predetermined position which will maintain the vehicle at the desired speed by the pull of output member 70 on the throttle linkage 24 against the throttle valve return spring, holding throttle valve 14 open to an extent which will provide the engine power and speed necessary to hold this vehicle speed.

The foregoing assumes a simple steady-state condition wherein the desired speed and actual vehicle speed is identical. As the vehicle is driven in normal operation, load changes occur which require engine power changes to maintain the desired vehicle road speed. Many factors are involved, such as changes in road grade, wind variations, and road surfaces. Therefore the actual vehicle speed will tend to decrease slightly or increase slightly depending upon whether the engine load demand increased or decreased. The logic control 38 will immediately sense the speed error between the desired speed and the actual vehicle speed, modifying the signal to solenoid coil 126 accordingly.

Assuming that the vehicle starts up a slight road grade, the actual vehicle speed will drop slightly. The logic control will generate a signal requiring the servomotor to open the throttle valve 14 slightly to provide additional engine power to compensate for the additional load. This signal will result in a slightly increased solenoid energization, urging magnet 116 and valve member 84 slightly leftwardly against the force of position feedback spring 140. This will cause control port 114 and port 98 to be in partial open registration, permitting a further decrease in absolute pressure in variable pressure chamber 62. This will result in a slightly greater pressure differential-generated force on power wall 58 which will move the power wall slightly rightward, causing output member 70 to move the throttle linkage 24 slightly toward the throttle valve opening position, opening the throttle valve slightly and increasing engine power. The position of the power wall 58 would again be fed back into valve member 84 by spring 140, causing the valve to again return to the poise position. It can be seen that valve member 84 will be caused to be moved slightly leftwardly or rightwardly as needed to hold the actual vehicle speed substantially at the desired vehicle speed.

The system may be deenergized by opening switch 42 or switch 44. It may also be deenergized when the brake pedal 26 is actuated. This will cause the vacuum release valve and switch 36 to be actuated. The switch portion will be opened, deenergizing the logic control 38. At the same time the valve portion of mechanism 36 will be opened to admit atmospheric pressure directly into variable pressure chamber 62 through conduit 34 and vacuum release port 78. Solenoid coil 126 will be deenergized since no signals will be transmitted to it from logic control 38. Spring 140 will therefore move valve member 84 and magnet 116 to the inactive position shown in FIG. 1. Control port 114 will register with atmospheric air port 100, re-connecting chamber 62 with the atmospheric air inlets 80 through the valve assembly. Power wall return spring 138 will move the power wall leftwardly to the position shown, and the force exerted by the power wall 58 on the throttle linkage 24 will be removed. The throttle valve will be moved toward the closed position by its return spring, assuming that the vehicle operator is not pressing downwardly on accelerator pedal 22. The engine will therefore return to the idle position. The entire road speed control system is therefore deenergized and the vehicle is again subject only to manual control through accelerator pedal 22.

Figure 2:
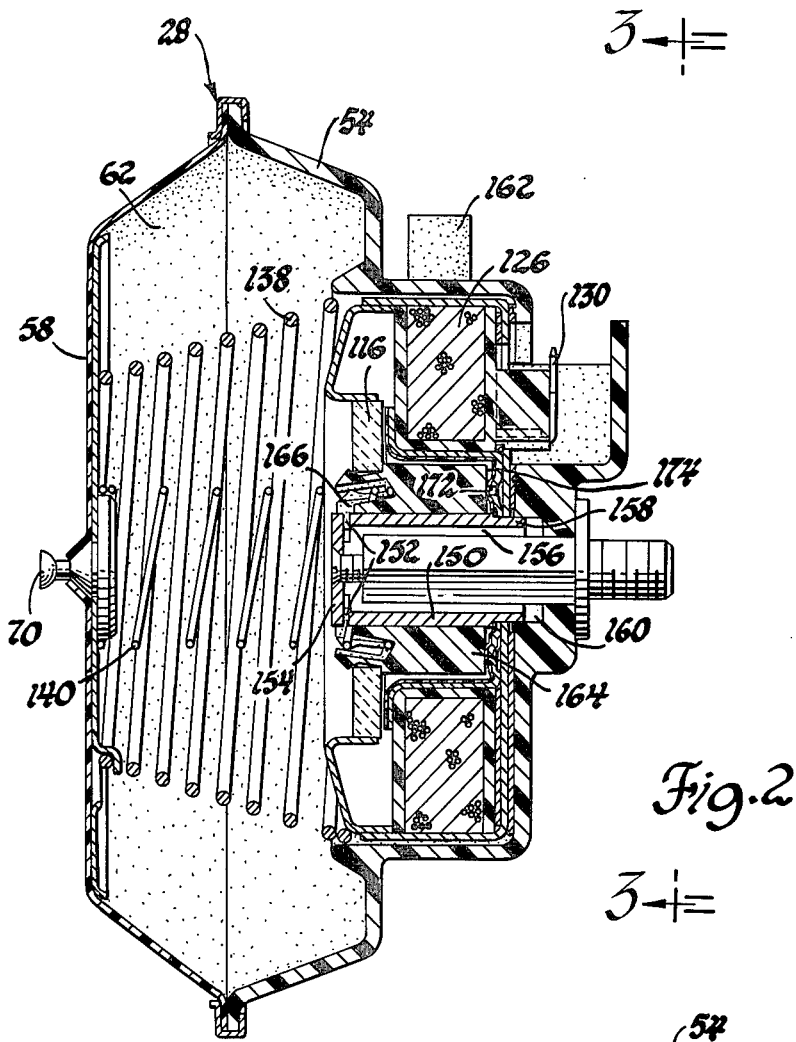
FIG. 2 is a cross section view of a modification of the servomotor illustrated in FIG. 1.
Figure 3:
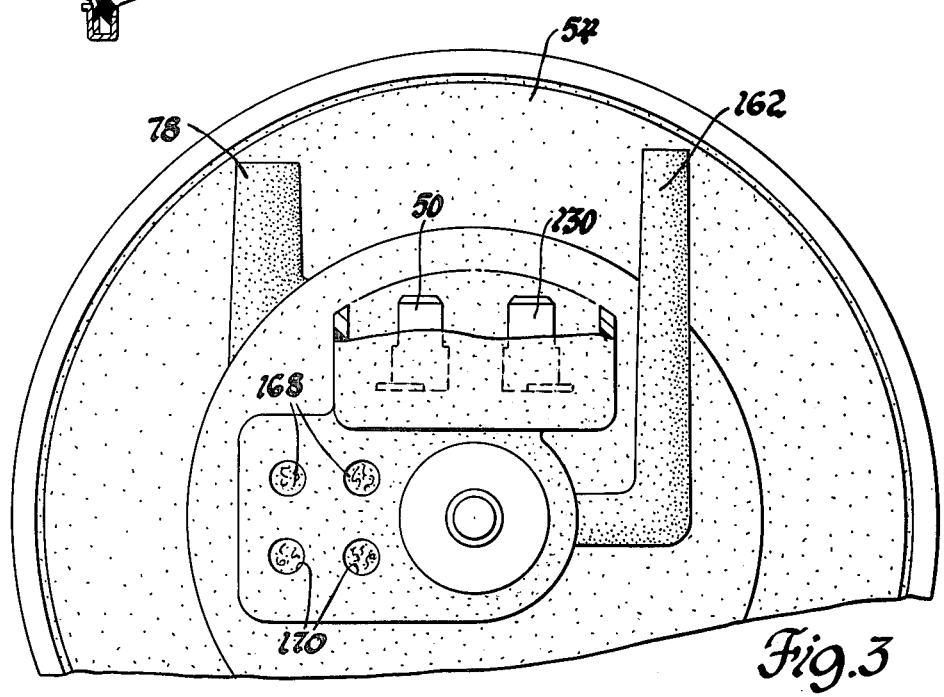
FIG. 3 is an elevation view taken in the direction of arrows 3—3 of FIG. 2 and having parts broken away.

A slightly modified servomotor is shown in FIGS. 2 and 3. Many of the parts are sufficiently similar in form and function so that the same reference characters are utilized. The major difference in construction is found in the orifice tube, port and valve arrangement of the valve member. In the modification only one port means is provided in the orifice tube and modulation is obtained by a valve edge on the movable valve member which modulates about a center position wherein the port means is approximately half open.

The orifice tube 150 of the valve assembly of FIG. 2 is formed as a cylinder with one closed end positioned within the variable pressure chamber 62. The port means 152 formed in the orifice tube is composed of two slots milled or otherwise suitably formed through the cylinder wall axially immediately adjacent the closed end 154 of orifice tube 150. The slots are formed on diametrically opposite sides of the orifice tube to maintain the valve in balance and eliminate side loading during valve operation. The inner passage 156 formed by orifice tube 150 is connected through the tube open end 158 to the atmospheric inlet chamber 160. This chamber is connected through a filter 168, seen in FIG. 3 through atmospheric air inlets 170, with atmosphere at all times. Vacuum is continually connected to chamber 62 through the subatmospheric pressure port 162 and orifice 172 while solenoid 126 is energized. In the inactive position, valve member 164 has a lip edge 166 axially positioned relative to port means 152 so that the ports are fully open. The end 174 of valve member 164 seals orifice 172 at this time. When the solenoid coil 126 is energized and magnet 116 is repulsed leftwardly, valve member 164 moves leftwardly to open orifice 172. With further valve member movement, valve member lip edge 166 at least partially closes port means 152, restricting the air at atmospheric pressure into chamber 62 and therefore permitting the decrease in absolute pressure in that chamber. In this construction the poise position is attained when the ports forming port means 152 are approximately half open. During initial actuation, valve member 164 will normally move leftwardly sufficiently to fully close port means 152. This will quickly evacuate chamber 62, moving power wall 58 rightwardly against the forces of springs 138 and 140. As before, position feedback spring 140 will act on valve member 164 and magnet 116, urging them rightwardly against the magnet repulsive force of solenoid coil 126. The poise position will be reached with lip edge 166 modulating the opening of port means 152 to maintain a poise position of the power wall 58 and maintain vehicle speed at the desired speed.

When additional engine power is required to maintain vehicle speed, as when starting up a road grade, the strength of the signal to solenoid coil 126 will increase, urging magnet 116 and valve member 164 leftwardly, further restricting port means 152 and thereby creating a greater pressure differential acting across power wall 58. This will result in slight additional opening of the engine throttle valve to obtain the necessary additional engine power. When less engine load is required, the signal from logic control 38 to solenoid coil 126 is decreased in strength, permitting magnet 116 and valve member 164 to be moved slightly rightward by position feedback spring 140, slightly opening port means 152 and allowing an additional amount of atmospheric air to enter chamber 62, with the net result that the absolute pressure in chamber 62 increases slightly, thereby decreasing the pressure differential acting across power wall 58. Springs 138 and 140 therefore move the power wall slightly leftward as seen in FIG. 2, allowing the throttle valve to be slightly closed to decrease engine power and therefore maintain the vehicle at the desired speed. These adjustments occur as needed so that the actual vehicle speed is maintained very close to the desired vehicle speed under varying road load conditions. A vacuum release port 78 is connected to chamber 62 in a manner similar to that of FIG. 1 so that the chamber may be quickly returned to atmospheric pressure when the servomotor is deenergized.

What is claimed is:

1. In a differential pressure operated servomotor comprising:
    a housing having a fixed wall and a power wall cooperating therewith to define a variable pressure control chamber on one side of said power wall, the other side of said power wall being exposed to atmospheric pressure, a valve assembly having an atmospheric pressure inlet port, a subatmospheric pressure port adapted to be connected to a source of subatmospheric pressure, a valve member having a movable control port normally connecting said variable pressure chamber with said atmospheric inlet port, said valve member being movable toward said power wall to progressively close said atmospheric inlet port to achieve a poised condition and being further movable to progressively open said subatmospheric pressure port by said movable control port,
    a position feedback spring acting between said power wall and said valve member to increase the spring force in inverse relationship to the distance between said power wall and said valve member,
    and means mounted on said housing fixed wall and selectively urging said valve member against the force of said feedback spring in accordance with power wall position demand and position error and, when so urging doing so with a force which decreases inversely with the distance said valve member moves away from said housing fixed wall toward said power wall.

2. A position feedback arrangement comprising:
    an axially movable output member adapted to have its axial position controlled in accordance with axial position demand and axial position feedback,
    a control member axially movable toward and away from said output member and adapted to control the axial position of said output member,
    first force-exerting means acting axially between and on said output member and said control member with a force which varies inversely with the axial distance between said output member and said control member to provide position feedback,
    and selectively actuatable second force-exerting means when actuated acting on said control member with a force which varies in accordance with the desired axial position of said output member, the force exerted by said second force-exerting means being further varied inversely with the distance between said output member and said control member to provide additional position feedback.

3. A vacuum servomotor of the type employed in road speed control systems on motor vehicles having means generating a signal reflecting a desired vehicle road speed and the speed error as the difference between the actual vehicle road speed and the desired vehicle road speed, said servomotor comprising:
    a housing having a fixed wall and a power wall cooperating to define a variable pressure chamber;
    a control valve assembly in said fixed wall, said control valve assembly including
        a vacuum supply port,
        an atmospheric air inlet port,
        a fixed valve member provided with a first valve port communicating with said vacuum supply port and a second valve port communicating with said atmospheric air inlet port,
        a slidable valve member slidably mounted on said fixed valve member and provided with a control port arranged to selectively register with said first and second valve ports and a part of said fixed valve member separating said first and second valve ports, a magnetic member secured to said slidable valve member and having its magnetic poles axially aligned with the axial direction of sliding movements of said slidable valve member, and a solenoid coil fixed axially adjacent said magnet in axial magnetic alignment therewith and of such polarity that when energized the adjacent magnetic poles of said magnet and said solenoid coil are of the same name;
    an output member attached to said power wall and adapted to control vehicle road speed when said servomotor is actuated;
    and spring means urging said power wall in a direction away from said fixed wall and having at least a portion thereof acting to urge said magnet and said slidable valve member axially toward said solenoid coil;
    said solenoid coil being adapted to be energized in accordance with the signal from the road speed control signal generating means and when so energized exerting a magnetic force urging said magnet and said slidable valve member toward said power wall in opposition of the force of said spring means acting on said magnet and said slidable valve member to decrease and then close the fluid communication between said chamber and said atmospheric air inlet port and then to progressively open communication between said variable pressure chamber and said vacuum supply port through said control port and said first valve port, the force exerted on said magnet by said spring means being inversely proportional to the distance between said magnet and said power wall and the magnetic force exerted between said magnet and said solenoid coil being inversely proportional to the axial distance therebetween, said forces being balanced when the desired vehicle speed is substantially the same as the actual vehicle speed and said control port is in the poised position wherein it is registered with the part of the fixed valve member separating said first and second valve ports.

4. In a differential pressure operated servomotor comprising a housing having a fixed wall and a power wall cooperating therewith to define a variable pressure control chamber on one side of said power wall, the other side of said power wall being exposed to atmospheric pressure, a valve assembly having an atmospheric pressure inlet port, a subatmospheric pressure port adapted to be connected to a source of subatmospheric pressure, and a valve member having movable port control means normally connecting said variable pressure chamber with said atmospheric inlet port, said valve member being movable toward said power wall to progressively close said atmospheric inlet port and to progressively open said subatmospheric pressure port by said movable port control means: a position feedback spring acting between said power wall and said valve member to increase the spring force exerted on said valve member in inverse relationship to the distance between said power wall and said valve member; and means mounted on said housing fixed wall and selectively urging said valve member against the force of said feedback spring in accordance with power wall position demand and position error and, when so urging doing so with a force which decreases inversely with the distance said valve member moves away from said housing fixed wall toward said power wall.

* * * * *